United States Patent [19]

Warman et al.

[11] Patent Number: 5,078,410
[45] Date of Patent: Jan. 7, 1992

[54] CENTRIFUGAL SEAL

[75] Inventors: Charles H. Warman, New South Wales; Anthony Grzina, Sydney; Philip N. Mitchell, Frenchs Forest, all of Australia; Denis J. Martin, deceased, late of Warrawee, Australia, by Norma Martin, executrix

[73] Assignee: Warman International Limited, NSW 2074, Australia

[21] Appl. No.: 134,776

[22] PCT Filed: Jan. 2, 1987

[86] PCT No.: PCT/AU87/00002
  § 371 Date: Oct. 30, 1989
  § 102(e) Date: Oct. 30, 1989

[87] PCT Pub. No.: WO87/04223
  PCT Pub. Date: Jul. 16, 1987

[30] Foreign Application Priority Data

Jan. 9, 1986 [AU] Australia .............. PH4152

[51] Int. Cl.$^5$ .............................. F16J 15/32
[52] U.S. Cl. .............................. 277/25; 277/152; 277/164
[58] Field of Search .......... 277/14 R, 25, 67, 68, 277/83, 133, 136, 137, 147, 152, 153, 154, 164, 174, 168, 170, 171

[56] References Cited

U.S. PATENT DOCUMENTS

| 2,352,336 | 6/1944 | Martin et al. | 277/25 X |
| 2,786,699 | 3/1957 | Kurti | 277/25 |
| 2,943,873 | 7/1960 | Hamm et al. | 277/25 |
| 3,117,796 | 1/1964 | Liebig | 277/171 X |
| 3,256,027 | 6/1966 | Chapel | 277/133 X |
| 3,627,390 | 12/1971 | Irwin | 277/25 X |
| 4,277,072 | 7/1981 | Forch | 277/153 X |
| 4,426,086 | 1/1984 | Fournie et al. | 277/164 X |
| 4,428,587 | 1/1984 | Forch | 277/25 |

FOREIGN PATENT DOCUMENTS

| 2163370 | 7/1972 | Fed. Rep. of Germany | 277/25 |
| 2507278 | 12/1982 | France | 277/25 |
| 1008546 | 3/1983 | U.S.S.R. | 277/25 |
| 2028440 | 3/1940 | United Kingdom | 277/25 |
| 815971 | 7/1959 | United Kingdom | 277/168 |

*Primary Examiner*—William A. Cuchlinski, Jr.
*Assistant Examiner*—Scott Cummings
*Attorney, Agent, or Firm*—Amster, Rothstein & Ebenstein

[57] ABSTRACT

A sealing member for sealing between a rotating surface (12) and a stationary cylindrical surface (13). The sealing member (8) is sealing engaged to the rotating surface (12) and is so constructed that, at a rotational speed greater than a predetermined speed of rotation of the rotating surface, the seal lip (27), due to centrifugal force, disengages from the stationary cylindrical surface (13) and, at or below the predetermined speed of rotation, sealingly engages the stationary cylindrical surface (13).

7 Claims, 3 Drawing Sheets

CENTRIFUGAL SEAL

This invention relates to sealing means for the prevention of fluid leakage between the rotating and stationary members of centrifugal fluid pumps, turbines, agitators and the like.

Conventionally, most centrifugal pumps prevent or control fluid leakage, both during operation and while stationary, by the use of interfacial seals. These seals contain stationary and rotating sealing surfaces which are held in sliding contact with a controlled surface pressure to minimise fluid leakage past the sealing surfaces. Interfacial seals may be subdivided into two classes dependent upon the disposition of the sealing surfaces relative to the rotating shaft axis, viz. axial seals and radial seals. Both types of seals are widely used in centrifugal fluid pumps.

Axial seals encompass the broad class of mechanical end face seals in which the sealing surfaces are flat, rigid, and disposed normally to the shaft axis. These seals have been widely applied to centrifugal pump, turbine and agitator shaft sealing applications with gas, liquid and slurries as the pumped product, and have been developed in an extensive range of variant designs.

Radial seals define the class of shaft seals in which the sealing contact surface is cylindrical and concentric with the pump shaft axis. The stuffing box is a commonly used seal of this type in which impermeable and compliant packing material is contained and pressurised in an annular cavity surrounding the shaft by an axially adjusted gland member. This type of seal is extensively applied in both liquid and slurry centrifugal pumps. Seals of this type belong to the class of radial seals.

The abrasive nature of pumped fluid in centrifugal slurry pumps commonly results in severe wear of shaft seal elements resulting in increased fluid leakage and maintenance requirements. Even with clean liquid pumps, sealing elements wear and require adjustment. These problems have resulted in the development of hydrodynamic shaft seals which are incorporated in many centrifugal slurry pumps. These invariably comprise auxiliary pumping vanes on the impeller which develop a hydrodynamic fluid pressure to eliminate leakage from the pump casing. During pump operation fluid leakage is eliminated or substantially reduced with this type of noncontacting seal. Supplementary sealing means are required additional to the hydrodynamic seal to prevent leakage from the pump when stationary. Such static seals are commonly interfacial seals of the radial type. Although fluid leakage, in operation, is effectively prevented or controlled by the hydrodynamic seal, the continuous sliding contact at the static seal surfaces results in abrasive wear at these surfaces with resultant loss of static sealing performance.

The aim of this invention is to overcome, by novel means, a number of limitations associated with conventional centrifugal fluid pump seals and to improve current sealing technology, particularly in relation to, but not limited to, centrifugal slurry pumps (where abrasive wear is greatest), and in accordance with the following objectives:

(a) to increase the effective operating life of pump seals between maintenance overhauls;

(b) to reduce abrasive wear rate at the sealing surfaces;

(c) to provide a seal suitable for use under the most adverse fluid conditions, including heterogeneous fluids typical of coarse abrasive slurries;

(d) to permit substantial axial displacement between the stationary and rotating sealing surfaces; and (e) to provide a seal with automatic loading of sealing surfaces and requiring no manual adjustment of loading either during installation or in operation.

The present invention in one broad form comprises a centrifugal sealing member for preventing leakage between a rotating member and a stationary member with an outer cylindrical surface, said sealing member comprising an annular support member and an inner annular engaging member, said support member being adapted to be mounted on said rotating member, with said annular engaging member being adapted to sealingly engage around the said outer cylindrical surface of the stationary member when said rotating member slows below a predetermined speed, and being adapted to disengage from around the said outer cylindrical surface when the rotating member rotates faster than the predetermined speed, to provide a running clearance between the centrifugal sealing member and the stationary member.

Preferably seals according to embodiments of the present invention are used for preventing fluid leakage through the running clearance between stationary and rotating members of centrifugal pumps and the like, which incorporate hydrodynamic means for preventing such leakage until their speed of rotation decreases by some predetermined fraction of normal operating speed. The seal comprises a stationary member with an outer cylindrical surface substantially concentric with the axis of rotation of the rotating members and adapted to be engaged in sealing contact by a surrounding annular sealing member detachably mounted on an axially adjacent rotating member by fluid tight means. The mass and the composite modulus of radial elasticity of the annular sealing member is so proportioned that, at a rotational speed greater that that at which leakage would cease to be prevented by the said hydrodynamic means, the annular sealing member extends radially outwards due to centrifugal force sufficiently to provide a running clearance between the rotating annular sealing member and the stationary cylindrical surface.

The invention will now be described by way of example with reference to the accompanying drawings, in which.

Like parts are illustrated by like characters throughout the specification and drawings.

Figure 1:
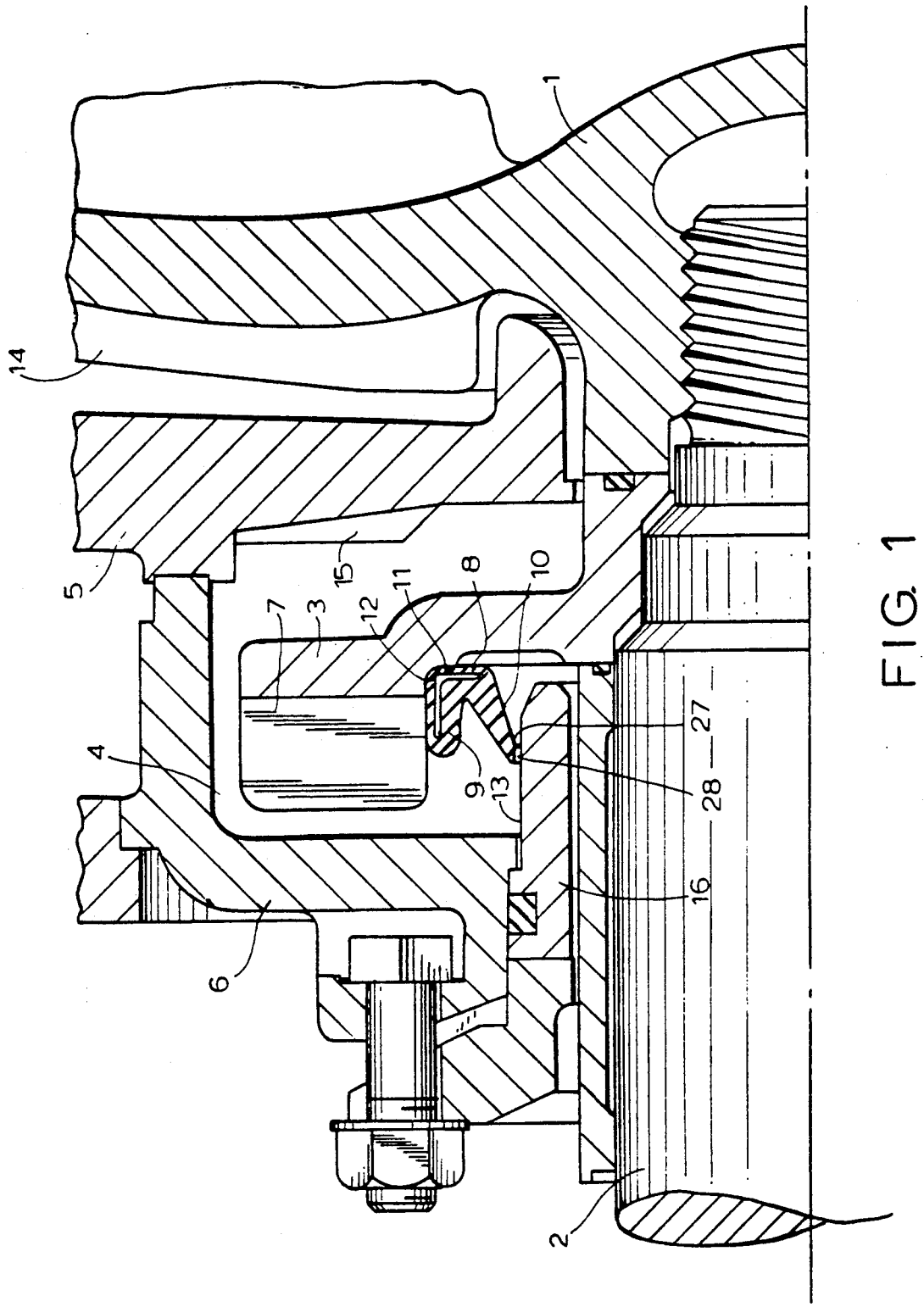
FIG. 1 is a partial cross sectional view of a preferred embodiment of the present invention with the pump shaft stationary.

FIG. 1 shows one preferred embodiment of the invention in a simple form as applied to a centrifugal slurry pump. Pump impeller 1 is attached to shaft 2 which contains the pressurised fluid discharging from the periphery of rotating impeller 1. A secondary sealing impeller or expeller 3 is mounted on shaft 2 adjacent to impeller 1 and contained within a separate sealing chamber 4 formed by the external surface of casing member 5 and expeller chamber 6 which are clamped together in sealing contact. Expeller 3 contains multiple vanes 7 of substantially radial form attached to a substantially plane disc rotatably driven by shaft 2 and substantially concentric therewith. The annular sealing member 8 comprises an outer annular support member 9 and an integral inner engaging member 10, made of a suitable elastomeric material. A stiffening reinforcement ring 11 may be embedded in the sealing member. The sealing ring 8 engages in a fluid tight manner in the annular spigot 12 in the expeller 3.

The dimensions of the engaging means 10 and its modulus of elasticity are chosen such that at rotational speeds greater than that at which leakage would cease to be prevented by hydrodynamic means (i.e. the rotation of the expeller 3), the engaging means 10 moves under the influence of the centrifugal force out of sealing engagement with the outer cylindrical sealing surface 13, to provide a running clearance between the rotating sealing member 8 and the cylindrical sealing surface 13.

The main elements of the hydrodynamic sealing means in the embodiment shown in FIG. 1 comprise the vanes 7 of expeller 3 and auxiliary leakage vanes 14 of impeller 1 operating in concert with the adjacent surfaces of casing 5, expeller chamber 6, and stationary spoiler vanes 15.

The principal elements of the seal, formed by utilising the sealing member of the present invention, of which one embodiment is shown in FIG. 1, comprise the annular sealing member 8, expeller 3, and stationary member 16.

Figure 2:
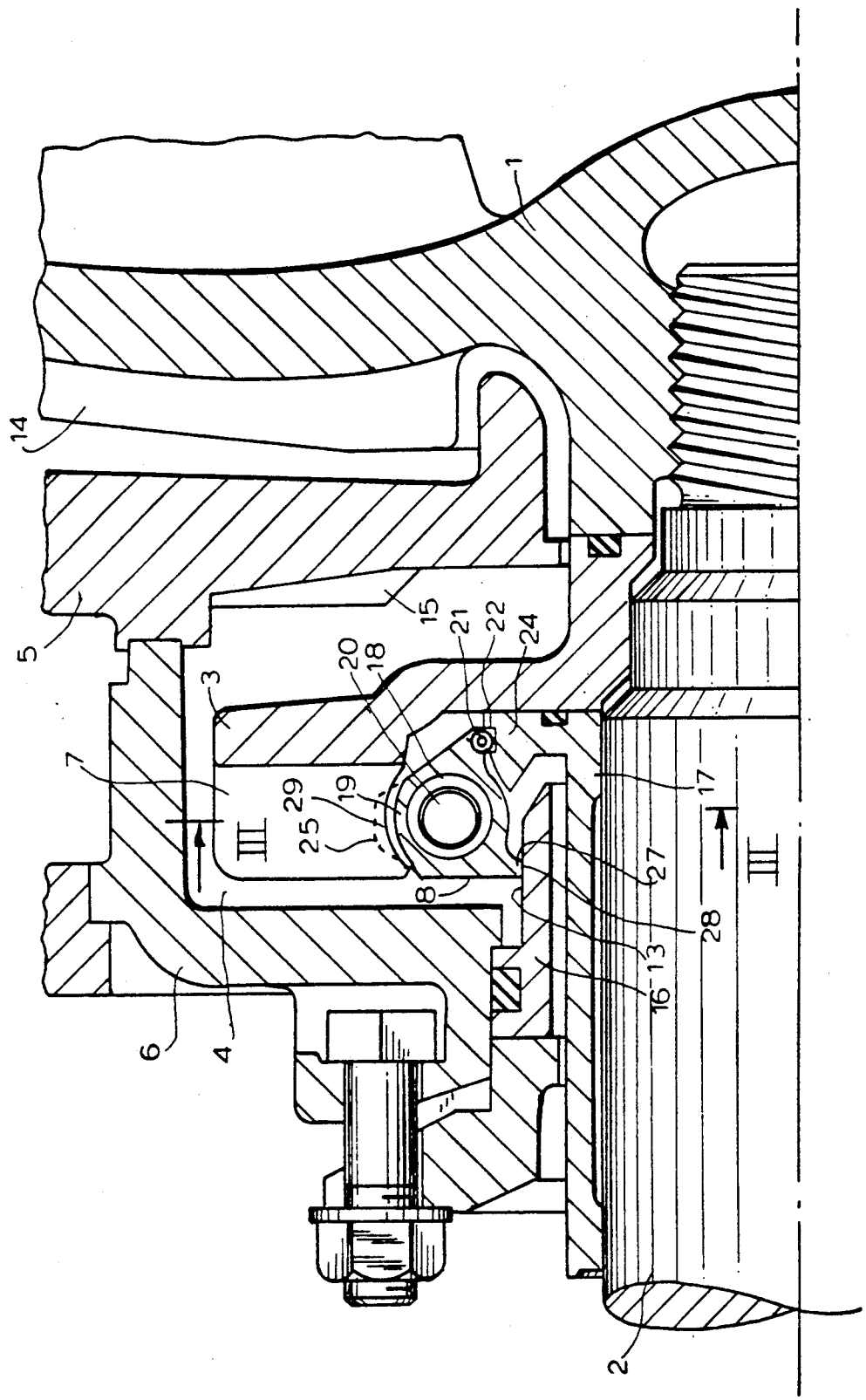
FIG. 2 illustrates another embodiment of the present invention in partial cross section with the pump shaft stationary.
Figure 3:
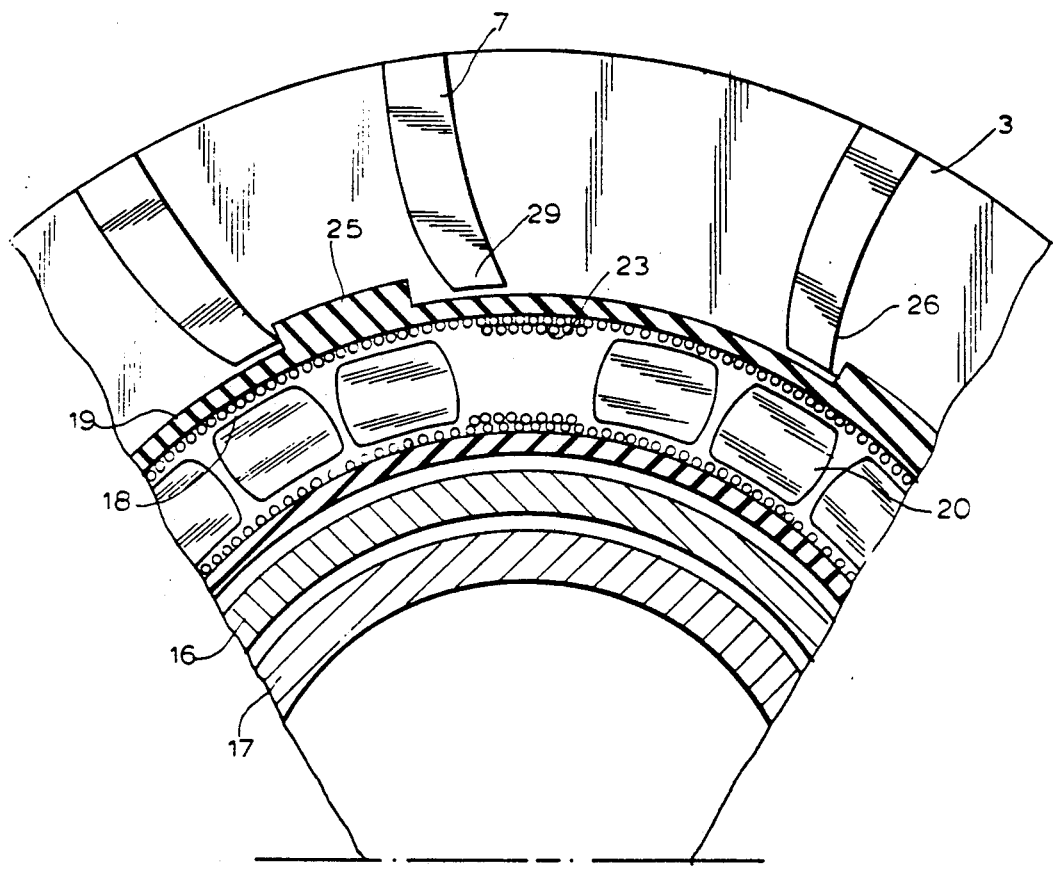
FIG. 3 is partial cross sectional view taken on line I—I of FIG. 2.

Another embodiment of the sealing member is shown in FIGS. 2 and 3. With reference to FIG. 2, the rotating sleeve 17 is mounted on shaft 2 adjacent and in driving contact with expeller 3. Stationary member 16 is mounted with sealing engagement in expeller chamber 6 with its outer cylindrical sealing surface 14 concentric with the axis of shaft 2. The annular sealing member 8 is the principal component of the seal, and comprises a helical tension spring 18 disposed in toroidal form with its rectilinear axis of symmetry colinear coaxial with the axis of shaft 2 and enclosed by and in intimate driving contact with an elastomeric sheath on annular engaging member 19, separate multiple ballast weights 20 mounted with working radial clearance within the toroidal core of spring 18, and a helical tension spring 21 disposed in toroidal form and moulded within an annular mounting bead of elastomer 22 concentric with shaft 2 (that is, its rectilinear axis of symmetry colinear with the axis of shaft 2). The multiple ballast weights 20 are configured to provide maximum density of the toroidal core of spring 18. They are typically constructed in high density material, and in the embodiment shown in FIG. 3 have a barrel shaped form with conical ends, and are packed with minimum radial and end clearance within the toroidal core of spring 18 to permit relative movement between the spring coils and ballast weights 20. Spring 18 contains driving means 23 to rotatably drive ballast weights 20 with annular sealing member 8. In the embodiment shown in FIG. 3, the driving means 23 is combined with a toroidal core diameter of spring 18 and provides a rotational driving surface for ballast weights 20. The mounting bead 22 is integral with elastomeric sheath 19 and displaces axially from helical tension spring 18. Mounting bead 22 engages with static sealing contact a matching grooved recess 24 in rotation sleeve member 17, which determines the axial and radial location of annular sealing member 8 relative to rotating shaft 2. Annular sealing member 8 is rotatably driven by multiple radially disposed projections 25 at its outer periphery which are integral with elastomeric sheath 19, and which engage with corresponding surfaces 26 of vanes 7 of expeller 3.

At its inner radial extremity, and displaced axially remote from mounting bead 22, annular sealing member 8 incorporates a radial inward projection of elastomeric sheath 19 to form a continuous sealing lip 27 of limited axial width, concentric with shaft 2, and having an inner cylindrical sealing surface 28 in radial sealing contact with outer cylindrical surface 13 of stationary member 16. The geometry of seal lip 27 is configured to provide for substantial radial wear without detriment to sealing performance. Sealing lip 27 may typically comprise a harder grade of elastomer than the elastomeric sheath 19, to which it is integrally formed, to provide more favourable wear characteristics. With pump shaft 2 stationary, the outer periphery of the annular sealing member 8 has a small radial clearance, with the inner radial extremity 29 of vanes 7 of expeller 3.

The principal elements of the seal, formed by utilising the sealing member of the present invention, of which one embodiment is shown in FIG. 2, comprise the annular sealing member 8, rotating sleeve 17, expeller 3, and stationary member 16.

Operation of the pump seal will be described with reference to FIGS. 1, 2 and 3. Effective sealing against fluid leakage is required for the two conditions of stationary and rotating shaft systems. With shaft 2 stationary, and in the low speed range during pump start-up, sealing is provided wholly by the seal of this invention. In this condition sealing chamber 4 is normally flooded with fluid, immersing the outer surface of annular sealing member 8 between seal lip 27 and the outer support member 9 (in FIG. 1) or elastomer mounting bead 22 (in FIG. 2). Sealing surface 13 of stationary sleeve member 16 and annular sealing member 8 are in sealing contact with a radial pressure predetermined to exclude fluid leakage past their common contact surfaces.

The inner surface area of annular sealing member 8 is normally exposed to the atmosphere and subject to ambient pressure. If the outer periphery of annular sealing member 8 is subjected to a fluid pressure elevated above ambient, as may occur by supercharging of the pump inlet, the increased fluid pressure acting upon annular sealing member 8 causes increased contact pressures at seal lip 27 (FIGS. 1 and 2), and at mounting bead 22 (in FIG. 2 only), thereby providing increased resistance to fluid leakage.

At normal pump operating speed, and in the upper speed range during pump start-up, sealing against fluid leakage between stationary and rotating members is provided wholly by hydrodynamic effects. The combination of expeller vanes 7 and auxiliary leakage vanes 14 of impeller 1 develops a centrifugal fluid pressure in excess of the impeller discharge pressure, hence fluid leakage from casing 5 via the sealing chamber 4 is prevented. In normal seal operation an equilibrium condition is established with fluid in sealing chamber 4 driven by expeller vanes 7 in an annular vortex at the periphery of the chamber, surrounding inner zones of air on both sides of expeller 3. Annular sealing member 8 occupies a fluid free region within the annular vortex, and leakage from sealing chamber 4 across sealing faces 13 and 28 is thus prevented by hydrodynamic fluid effects. At full operating pump speed annular sealing member 8 is in its fully radially expanded position, with its outer periphery in supporting contact with surfaces 29 of expeller 3 (for embodiment shown in FIG. 2), with corresponding separation of sealing surfaces 13 and 28.

In the FIG. 1, radial expansion of annular sealing lip 10 of member 8 is caused by centrifugal force acting on the mass of the lip. This radial expansion is resisted at low speeds by elastic circumferential tension in seal lip 10.

In the speed range approaching normal pump operating speeds the combined centrifugal loading predominates over the combined elastic circumferential tension, resulting in radial expansion of annular sealing member lip 27, with a corresponding radial separation of sealing surfaces 13 and 28. The critical rotational speed of annular sealing member 19 at which sealing surfaces 13 and 28 separate is an important seal design parameter, and is a function of the axial spacing relationship of seal lip 27, spring 18 and mounting bead 22; the masses of ballast weights 20, spring 18 and elastomeric sheath 19; and the radial stiffness of spring 18, seal lip 10 stiffness and mass and elastomeric sheath 19. Typically these design parameters are configured to produce separation of sealing surfaces 13 and 28 at a rotational speed lower than the lowest limit of normal pump operating speeds.

Sealing surfaces 13 and 28 are thus in sliding contact only during the brief starting and stopping process. During normal pump operation the surfaces are separated with consequent absence of abrasive wear. This is of particular relevance in centrifugal slurry pumps in which sliding surfaces are unavoidably contaminated by abrasive solid particles with resultant rapid abrasive wear. Abrasive wear at sealing surfaces 13 and 28 is limited only to the acceleration and deceleration periods during starting and shut-down of the pump during which the pump speed is below the critical seal separation speed.

It is a common feature of centrifugal slurry pumps that axial adjustment of shaft 2 and associated rotating components is normally provided to improve deteriorating pump performance resulting from increased impeller end clearances caused by abrasive wear. The present invention can tolerate large axial displacement of seal lip of the sealing member due to its cylindrical contact geometry and axial extent of the matching stationary sealing surface. Axial shaft adjustment is beneficial to seal operation with this invention as the localised worn stationary surface adjacent to the surface of annular sealing member 16 is replaced with unworn surface by axial adjustment of the shaft.

We claim:

1. In a centrifugal sealing member for preventing leakage between a rotating member and a stationary member with an outer cylindrical surface, said sealing member comprising an outer annular support member and an inner annular engaging member, said outer annular support member being sealingly mounted on the rotating member, with said annular engaging member sealingly engaging around the outer cylindrical surface of the stationary member when the rotating member slows below a critical rotational speed and disengaging from around the outer cylindrical surface when the rotating member rotates faster than the critical rotational speed, to provide a running clearance between said sealing member and the stationary member whereby said annular engaging member has its mass and its composite modulus of radial elasticity so proportioned that, when said sealing member is mounted on the rotating member and the rotating member is rotated at any speed at or less than the critical rotation speed, the annular engaging member sealingly engages on the outer cylindrical surface and, when the rotating member is rotated above the critical speed, said annular engaging member extends radially outwardly due to centrifugal force to provide a running clearance between said sealing member and the outer cylindrical surface;

the improvement comprising:
said outer annular support member being made of elastomeric material;
said inner annular engaging member being made of elastomeric material and extending obliquely radially inwardly from said outer annular support member, said inner annular engaging member being of tapered cross section, tapering towards its free end with its cross section at any point along its length being smaller than the cross section of said outer annular support member; and
a reinforcing ring completely inbedded in said outer annular support member;
whereby said outer annular support member sealingly engages by means of its own resilience on the rotating member.

2. In a centrifugal sealing member for preventing leakage between a rotating member and a stationary member with an outer cylindrical surface, said sealing member comprising an annular support member and an inner annular engaging member, said support member being sealingly mounted on the rotating member, with said annular engaging member sealingly engaging around the outer cylindrical surface of the stationary member when the rotating member slows below a critical rotational speed and disengaging from around the outer cylindrical surface when the rotating member rotates faster than the critical rotational speed, to provide a running clearance between said sealing member and the stationary member;

the improvement comprising:
said annular support member having an elastomeric sheath and a helical tension spring enclosed by and in intimate driving contact with said elastomeric sheath, said helical tension spring being disposed in substantially toroidal form with its rectilinear axis of symmetry substantially colinear with the axis of the outer cylindrical surface of the stationary member, with multiple ballast masses enclosed within the toroidal form of said helical tension spring adapted to be driven by and rotated with said helical tension spring.

3. A centrifugal sealing member according to claim 2 wherein, in use, the outward radial extension due to centrifugal force on said annular engaging member is limited by contact with opposing surrounding surfaces on the rotating member so as to provide a predetermined minimum running clearance between said annular engaging member and the outer cylindrical surface of the stationary member.

4. A centrifugal sealing member according to claim 2 wherein said inner annular engaging member comprises a lip projecting from said elastomeric sheath which, in use, makes sealing contact with the outer cylindrical surface of the stationary member, said projecting lip being configured for substantial radial wear.

5. A centrifugal sealing member according to claim 3 wherein the rotating member defines a grooved recess, and said support member comprises an annular lateral extension of said elastomeric sheath terminating axially in a mounting bead moulded about a toroidal helical spring, said bead engaging detachably and sealingly in the matching grooved recess of the rotating member.

6. A centrifugal sealing member according to claim 5 wherein said elastomeric sheath is provided on its outer peripheral surface with projections for driving engagement with the rotating member.

7. A centrifugal seal assembly according to claim 6 wherein the internal diameter of said unworn projecting lip is before extension less than the unworn diameter of the cylindrical surface of the stationary member on which it seals by an amount such that sealing engagement is maintained by the elasticity of said annular sealing member after significant wear of both said projecting lip and the cylindrical surface has occurred.

* * * * *